United States Patent
Le et al.

(10) Patent No.: US 8,073,596 B2
(45) Date of Patent: Dec. 6, 2011

(54) SYSTEM AND METHOD FOR DEPLOYING A SAFETY SYSTEM

(75) Inventors: Jialiang Le, Canton, MI (US); Todd Clark, Dearborn, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 12/419,385

(22) Filed: Apr. 7, 2009

(65) Prior Publication Data

US 2010/0256872 A1 Oct. 7, 2010

(51) Int. Cl.
*B60R 21/0132* (2006.01)

(52) U.S. Cl. ......... 701/45; 701/46; 280/728.1; 280/734; 280/735

(58) Field of Classification Search .............. 701/45–47; 280/728.1, 734–735
See application file for complete search history.

(56) References Cited

U.S. PATENT DOCUMENTS

| | | | |
|---|---|---|---|
| 5,470,103 A | 11/1995 | Vaillancourt et al. | |
| 6,176,513 B1 | 1/2001 | Neidert | |
| 6,915,196 B2 | 7/2005 | Rao et al. | |
| 6,991,255 B2 | 1/2006 | Henderson et al. | |
| 7,162,343 B2 | 1/2007 | Subbian et al. | |
| 7,195,092 B2 | 3/2007 | Wu et al. | |
| 7,260,461 B2 | 8/2007 | Rao et al. | |
| 7,424,354 B2 * | 9/2008 | Shen ............................. | 701/45 |
| 7,522,982 B2 * | 4/2009 | Le et al. ........................ | 701/45 |
| 7,590,481 B2 * | 9/2009 | Lu et al. ........................ | 701/70 |
| 2004/0182627 A1 | 9/2004 | Bujak | |
| 2007/0124048 A1 | 5/2007 | Clark et al. | |
| 2007/0228704 A1 | 10/2007 | Cuddihy et al. | |
| 2007/0228705 A1 | 10/2007 | Rao et al. | |
| 2007/0267848 A1 | 11/2007 | Harase et al. | |

* cited by examiner

*Primary Examiner* — Paul N Dickson
*Assistant Examiner* — Nicole Verley
(74) *Attorney, Agent, or Firm* — Frank A. MacKenzie; Brooks Kushman P.C.

(57) ABSTRACT

A system and method are provided for deploying a safety system when a vehicle involved in a front crash may be experiencing rotational velocity. The vehicle may include a number of acceleration and rotational sensors. The vehicle may further include a controller that may be configured to determine if the vehicle is involved in a frontal crash using a combination of the acceleration and rotational sensors. The controller may also be configured to determine if the vehicle experiences rotational energy during the frontal crash using a combination of the acceleration and rotational sensors. The controller may also be configured to deploy vehicle safety systems, including at least one side safety system, if it is determined that the vehicle is involved in a frontal crash and the vehicle is experiencing rotational energy.

20 Claims, 3 Drawing Sheets

SYSTEM AND METHOD FOR DEPLOYING A SAFETY SYSTEM

BACKGROUND

1. Technical Field

One or more embodiments relate to a system and method for deploying a vehicle safety system based on a rotational tendency, direction, and/or velocity of a vehicle.

2. Background Art

With reference to conventional crash sensor systems, a vehicle may include a number of crash sensors systems that are designed to generate signals indicative of vehicle operation. The crash sensors incorporated within a vehicle may include acceleration sensors, pressure sensors, and/or rotational sensors. The conventional crash sensor system may further include a controller that may receive the signals transmitted by the crash sensors. The controller may use the signals received in order to determine whether the vehicle has been involved in a frontal, side, or roll-over crash. Unfortunately, conventional crash sensor systems are designed to protect an occupant of a vehicle according to a specific crash mode (e.g., frontal, side, roll-over crash) by deploying a corresponding safety system (e.g., frontal airbags deployed during a frontal crash, pelvic and curtain airbags deployed during a side and/or roll-over crash).

For example, a vehicle may include a pair of front accelerometer sensors located near or about a front end of the vehicle. The front accelerometer sensors may operate to generate a pair of accelerometer signals indicative of acceleration along a longitudinal axis about the front end of the vehicle. The vehicle may further include a central accelerometer sensor located near or about a central portion of the vehicle. The central accelerometer sensor may operate to generate an acceleration signal indicative of acceleration along a longitudinal axis about the center of gravity of the vehicle. The acceleration signals generated by the pair of front accelerometer sensors and the central acceleration sensor may be transmitted to the controller.

Because conventional crash systems process the received signals according to a specific crash mode, the controller may process the received acceleration signals according to a front crash mode and may use the received signals in order to determine whether the vehicle has been involved in a frontal crash. For example, if the controller determines that the vehicle is involved in a frontal crash, the controller may deploy a number of frontal safety systems (e.g., frontal airbags and/or one or more seatbelt pretensioners).

Likewise, conventional crash sensor systems may include pressure sensors mounted within a frame of a vehicle door and a central accelerometer sensor located near the central portion of the vehicle. The central accelerometer sensor may operate to generate acceleration signals indicative of acceleration along a lateral axis about the center of gravity of the vehicle. Again, the controller may process the received signals according to a side crash mode and may use the received signals in order to determine whether the vehicle has been involved in a side crash. For example, if the controller determines that the vehicle is involved in a side crash, the controller may deploy a number of side safety systems (e.g., side airbags and/or overhead side curtain airbags).

SUMMARY

A system and method are provided for deploying a vehicle safety system in a vehicle experiencing rotational velocity. The vehicle may include at least two front acceleration sensors configured to generate at least two values indicative of acceleration along a longitudinal axis about a front end of the vehicle. The vehicle may further include a longitudinal sensor configured to generate a longitudinal acceleration signal indicative of acceleration along a longitudinal axis about a center of gravity of the vehicle. A controller may be used to determine a rotational value, indicative of rotational velocity about an axis of the vehicle that is normal to a surface of a road, if the front acceleration signals and the longitudinal acceleration signal exceed a front crash threshold. Also, the controller may deploy a vehicle safety system including a side safety system if the rotational value exceeds a rotational value threshold

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Since conventional sensor systems process transmitted signals according to a specific crash mode, if the vehicle experiences rotational tendency, direction, or velocity during a front crash an occupant within the vehicle may be injured when thrust against an interior side door, wall or window. Such an injury may result because conventional frontal crash mode processing algorithms may not account for vehicle rotational tendency during frontal crashes. Furthermore, the signals received by the controller may indicate a frontal crash and the controller may deploy the safety systems designated to the frontal crash mode. As such, the controller may not deploy a side curtain airbag, which is typically designated to the side and/or rollover crash modes, because the received signals did not indicate that the vehicle had been involved in a side and/or rollover crash. By processing crash sensor systems according to a specific crash mode, and by the non-inclusion of vehicle rotational tendency, the controller may fail to deploy multiple vehicle safety systems (e.g., front airbags and side curtain airbags) during a frontal crash that is experiencing rotational tendency. Such a failure to deploy multiple vehicle safety systems may correspondingly fail to further reduce injury to the occupants of the vehicle.

Figure 1:
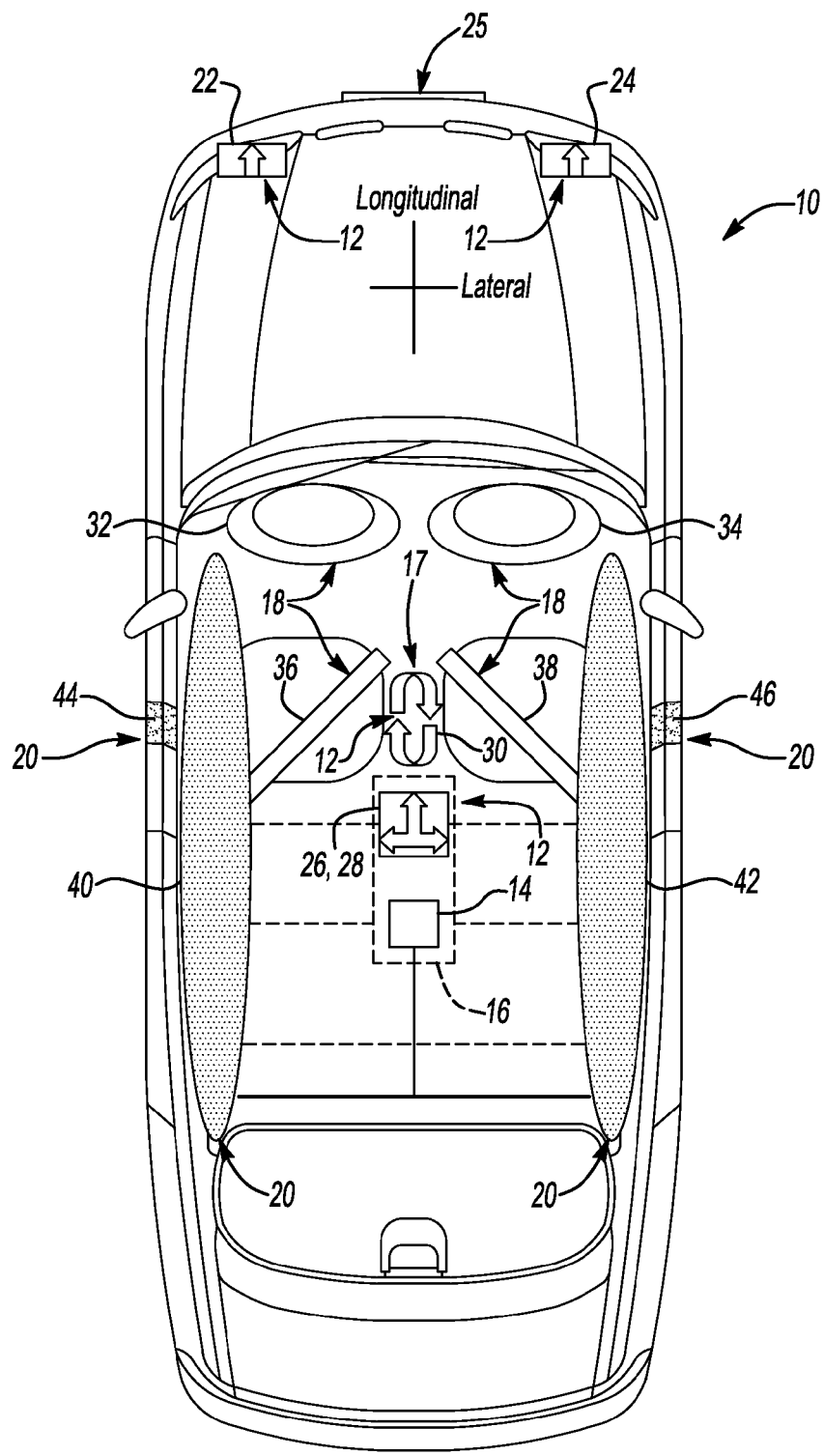
FIG. 1 is a top plan view of a vehicle in accordance with one or more embodiments.

FIG. 1 illustrates a top plan view of a vehicle 10 that includes a number of crash sensors 12. The vehicle 10 may include a controller 14 that operates to receive signals generated by the crash sensors 12 in order to determine if the vehicle 10 has been involved in a front, side, or roll-over crash. One or more embodiments contemplate that the controller 14 may be included within a restraint control module (RCM) 16 that is typically positioned at, or near, a central location 17 within the vehicle 10.

One or more embodiments contemplate that the crash sensors 12 may generate and transmit signals indicative of vehicle acceleration, rotation, and other vehicle operating conditions that may indicate when the vehicle 10 is involved in a front, side, or roll-over crash. The controller 14 may receive the signals generated and may determine whether the vehicle 10 has been involved in a frontal, side, or roll-over crash. Upon determining whether the vehicle 10 has been involved in a frontal, side, or roll-over crash, the controller 14 may deploy a number of frontal safety systems 18, side and/or rollover safety systems 20, 36 and 38.

More particularly, the crash sensors 12 incorporated within the vehicle 10 may include a pair of frontal sensors 22, 24 that are positioned about, or near, a front end 25 of the vehicle 10. The frontal sensors 22, 24 may operate to provide the controller 14 with a pair of acceleration signals indicative of acceleration along a longitudinal axis about the front end 25 of the vehicle 10. The controller 14 may use the acceleration signals received from the pair of frontal sensors 22, 24 in order to determine whether a frontal impact crash has occurred.

The vehicle 10 may further include a longitudinal sensor 26 that is positioned about, or near, a central location 17 of the vehicle 10. The longitudinal sensor 26 may operate to provide the controller 14 with a central acceleration signal indicative of acceleration along a longitudinal axis about the center of gravity of the vehicle 10. The vehicle 10 may also include a lateral sensor 28 that is positioned about, or near, the central location 17 of the vehicle 10. The acceleration sensor 28 may operate to provide the controller 14 with a central acceleration signal indicative of acceleration along a lateral axis about the center of gravity of the vehicle 10. One or more embodiments contemplate that the longitudinal and lateral sensors 26, 28 may also be included within the RCM 16. The controller 14 may use the central acceleration signals received from the longitudinal and lateral sensors 26, 28 in order to verify whether a front and/or side crash has occurred.

A rotational sensor 30 may also be included within the vehicle 10. One or more embodiments contemplate that the rotational sensor 30 may be a yaw rate sensor or any other sensor suitable for providing a rotational signal indicative of the rotational tendency, direction and angular velocity of the vehicle 10 about an axis normal to the surface of the road.

The vehicle may also include front safety systems 18 and/or side safety systems 20. The frontal safety systems may include a pair of frontal airbags 32, 34, and/or a pair of seatbelt pretensioning systems 36, 38. The side safety systems 20 may include a pair of overhead side curtain airbags 40, 42 which may typically be deployed during a side and/or rollover crash. The side safety systems 20 may also include a pair of side airbags 44, 46 which may be deployed only during a side crash. However, one or more embodiments contemplates that other front, side, and overhead safety systems may be included within the vehicle 10 in order to protect an occupant during a frontal, side, or roll-over crash.

Figure 2:
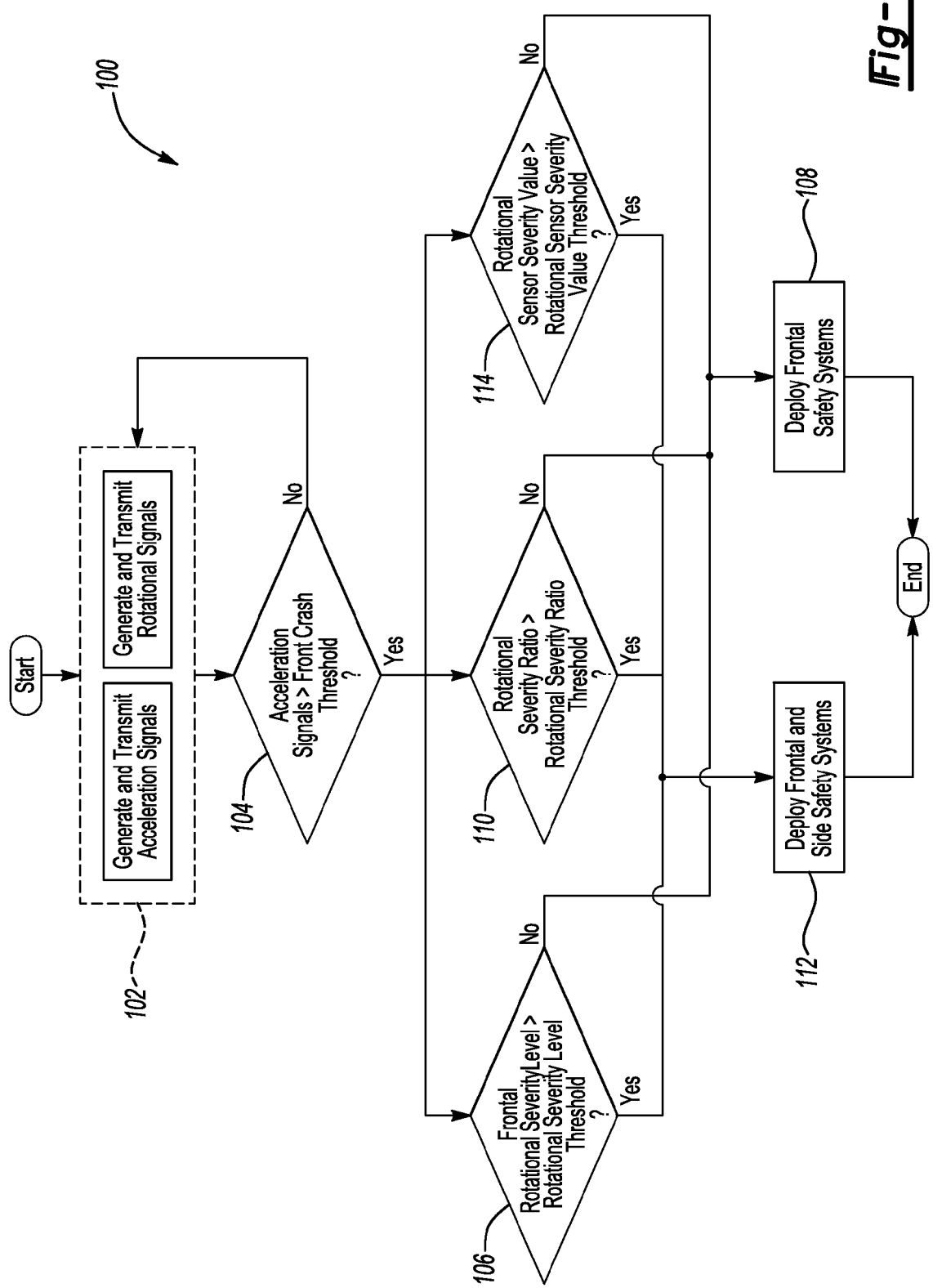
FIG. 2 is a flow diagram depicting one or more embodiments described herein.

FIG. 2 illustrates a flow diagram 100 according to one or more embodiments. However, it should be noted that the flow diagram 100 is merely illustrative, and the operation, function or steps of the method may be performed in a fashion other than the order described herein. Operation 102 illustrates that the vehicle crash sensors 12 may generate and transmit signals to the controller 14. More particularly, the frontal, longitudinal, and lateral sensors 22, 24, 26, 28 and the rotational sensor 30 may generate and transmit acceleration signals and a rotational signal to the controller 14. Once the acceleration and rotational signals are received, the flow diagram 100 proceeds to operation 104.

In operation 104, the controller 14 may determine whether the acceleration signals received from the frontal and longitudinal sensors 22, 24, 26 exceed a front crash threshold. By comparing the acceleration signals from the frontal and longitudinal sensors 22, 24, 26 with respect to the front crash threshold, the controller 14 may determine whether the vehicle 10 has been involved in a frontal crash. If the controller 14 determines that the vehicle 10 has been involved in frontal crash, then the flow diagram 100 proceeds to operations 106, 110, and 114. However, if the controller 14 determines that the vehicle 10 is not involved in a front crash, then the flow diagram 100 proceeds back to operation 102.

In operation 106, the controller 14 may use the acceleration signals received from the acceleration sensors (22, 24) in order to determine a front rotational severity level using the following exemplary equation:

$$\text{Front\_Rotational\_Severity\_Level} = \int a_1 dt - \int a_2 dt \quad (1)$$

where,
Front_Rotational_Severity_Level is the determined front rotational severity level;
$a_1$ is the acceleration signal received from the frontal sensor 22; and
$a_2$ is the acceleration signal received from the frontal sensor 24.

With reference to Equation (1), the controller 14 may first integrate the acceleration signals received from the frontal sensors 22, 24 in order to determine a pair of velocity values. Once the pair of velocity values has been determined, the controller 14 may determine the front rotational severity level by taking the difference between the pair of velocity values.

The controller 14 may then compare the front rotational severity level against a rotational severity level threshold. If the front rotational severity level does not exceed the rotational severity level threshold, then the controller 14 may determine that the vehicle 10 is not experiencing sufficient rotational tendency, rotational direction, and rotational velocity (e.g., rotational energy) about an axis normal to the surface of the road, and the flow diagram 100 proceeds to operation 108. In operation 108, the controller 14 may deploy the front safety systems 18. More particularly, the controller 14 may deploy the front airbags 32, 34 and/or engage the pair of seat belt pretensioning systems 36, 38.

In one non-limiting example, the rotational severity level threshold may be 10 miles per hour (MPH). If the front rotational severity level exceeds the 10 MPH threshold, then the controller 14 may determine that the vehicle is experiencing rotational energy about one of the frontal sensors 22, 24. However, the rotational severity level threshold of 10 MPH is merely illustrative of one non-limiting embodiment. Furthermore, the rotational severity level threshold may be adjusted according to experimentation, vehicle make, vehicle model, and/or the sensors implemented.

With reference back to operation 106, if the front rotational severity level does exceed the rotational severity level threshold, then the controller 14 may determine that the vehicle 10 is experiencing sufficient rotational energy about an axis normal to the surface of the road, and the flow diagram 100 proceeds to operation 112. In operation 112, the controller 14 may deploy both the front and side safety systems 18, 20. More particularly, the front safety systems 18 deployed in operation 112 may include the pair of front airbags 32, 34, and/or the seat belt pretensioning systems 36, 38. In addition, the side safety systems 20 deployed in operation 112 may include the curtain airbags 40 and 42. By deploying the front and side safety systems 18, 20, the occupant may be protected if the vehicle 10 is experiencing rotational energy about an axis normal to the surface of the road.

With reference back to operation 104, if the controller 14 determines that the vehicle 10 has been involved in frontal crash, then the flow diagram 100 also proceeds to operation 110. In operation 110, the controller 14 may use the acceleration signals received from the longitudinal and lateral sensors 26, 28 in order to determine a rotational severity ratio. The controller 14 may determine the rotational severity ratio using the following exemplary equation:

$$\text{Rotational\_Severity\_Ratio} = \frac{\int a_{lateral} dt}{\int a_{longitudinal} dt} \qquad (2)$$

where,

Rotational_Severity_Ratio is the determined rotational severity ratio;

$a_{longitudinal}$ is the acceleration signal generated by the longitudinal sensor 26; and $a_{lateral}$ is the acceleration signal generated by the lateral sensor 28.

With reference to Equation (2), the controller 14 may first integrate the acceleration signals received from the longitudinal and lateral sensors 26, 28 in order to determine a longitudinal and lateral velocity of the vehicle 10. After determining the longitudinal and lateral velocity of the vehicle 10, the controller 14 may determine the rotational severity ratio by dividing the lateral velocity by the longitudinal velocity, as illustrated in Equation (2).

The controller 14 may compare the rotational severity ratio against a rotational severity ratio threshold. If the controller 14 determines that the rotational severity ratio exceeds the rotational severity ratio threshold, then the controller 14 may determine the vehicle 10 is experiencing sufficient rotational energy about an axis normal to the surface of the road, and the flow diagram 100 proceeds to operation 112.

In one non-limiting example, the rotational severity ratio threshold may be set to a value of 0.5. If the front rotational severity ratio exceeds the 0.5 threshold, then the controller 14 may determine that the vehicle is experiencing rotational energy about one of the frontal sensors 22, 24. However, the rotational severity ratio threshold of 0.5 is merely illustrative of one non-limiting embodiment. Furthermore, the rotational severity ratio threshold may be adjusted according to experimentation, vehicle make, vehicle model, and/or the sensors implemented.

With reference to operation 112, the controller 14 may deploy both the front and side safety systems 18, 20. More particularly, the front safety systems 18 deployed by the controller 14 in operation 112 may include the pair of front airbags 32, 34, and/or the seat belt pretensioning systems 36, 38. In addition, the side safety systems 20 deployed by the controller 14 in operation 112 may include the curtain airbags 40 and 42. By deploying the front and side safety systems 18, 20, the occupant may be protected if the vehicle 10 is involved in a frontal crash that experiences sufficient rotational energy about an axis normal to the surface of the road.

With reference back to operation 110, if the rotational severity ratio is less than the rotational severity ratio threshold, then the controller 14 may determine that the vehicle 10 is not experiencing sufficient rotational energy about an axis normal to the surface of the road, and the flow diagram 100 proceeds to operation 108. In operation 108, the controller 14 may deploy the front safety systems 18. More particularly, the controller 14 may deploy the front airbags 32, 34 and/or engage the pair of seat belt pretensioning systems 36, 38.

With reference back to operation 104, if the controller 14 determines that the vehicle 10 has been involved in frontal crash, then the flow diagram 100 also proceeds to operation 114. In operation 114, the controller 14 may use the rotational signal transmitted by the rotational sensor 30 in order to generate a rotational severity value. One or more embodiments contemplate that the rotational severity value may be the rotational angle obtained by integrating the signal received from the rotational sensor 30. More particularly, one or more embodiments contemplate that the rotational severity value may be the rotational angle obtained by integrating the signal received from a yaw rate sensor.

With reference back to operation 114, the controller 14 may compare the rotational severity value against a rotational severity value threshold. If the rotational severity value exceeds the rotational severity value threshold, then the controller 14 may determine that the vehicle 10 may be experiencing rotational energy about an axis normal to the surface of the road, and the flow diagram 100 proceeds to operation 112.

In one non-limiting example, the controller 14 may be configured to receive a rotational severity value from a yaw rate sensor. The controller 14 may further be configured to determine if the vehicle 10 exceeds a rotational severity value threshold of 70 degrees per second. If the controller 14 determines that the rotational severity value received from the yaw rate sensor exceeds 70 degrees per second, then the controller 14 may determine that the vehicle may be experiencing rotational energy about an axis normal to the surface of the road. However, the rotational severity value threshold of 70 degrees per second is merely illustrative of one non-limiting embodiment. Furthermore, the rotational severity value threshold may be adjusted according to experimentation, vehicle make, vehicle model, and/or the rotational sensor implemented.

In operation 112, the controller 14 may deploy both the front and side safety systems 18, 20. More particularly, the front safety systems 18 deployed by the controller 14 in operation 112 may include the pair of front airbags 32, 34, and/or the seat belt pretensioning systems 36, 38. The side safety systems 20 deployed by the controller 14 in operation 112 may include the curtain airbags 40 and 42. By deploying the front and side safety systems 18, 20, the occupant may be protected if the vehicle 10 is involved in a frontal crash that experiences sufficient rotational energy about an axis normal to the surface of the road.

However, if the rotational severity value does not exceed the rotational severity value threshold, then the controller 14 may determine that the vehicle 10 is not experiencing rotational energy about an axis normal to the surface of the road, and the flow diagram proceeds to operation 108. In operation 108, the controller 14 may deploy the front safety systems 18. More particularly, the controller 14 may deploy the front airbags 32, 34 and/or engage the pair of seat belt pretensioning systems 36, 38.

Figure 3:
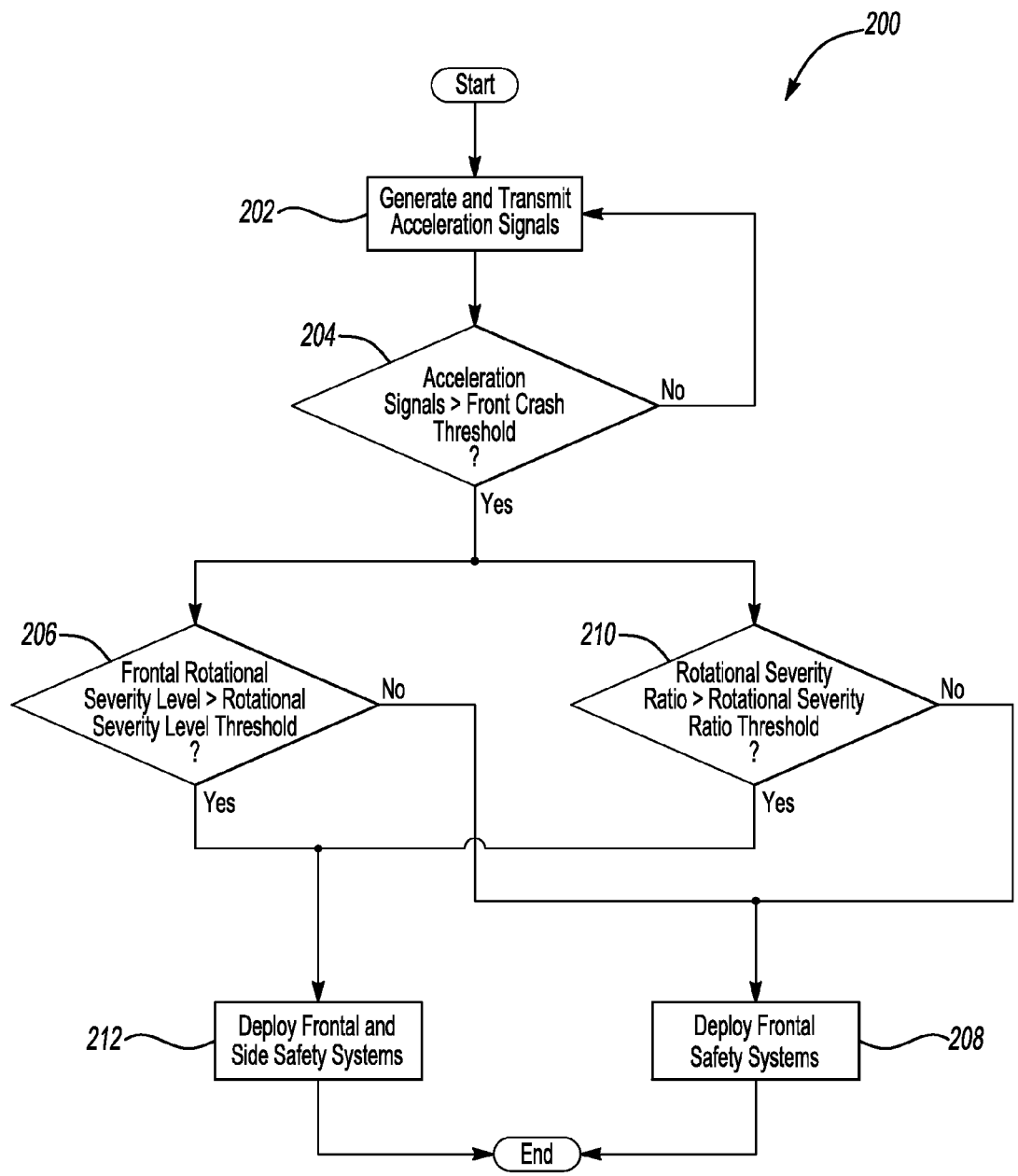
FIG. 3 is a second flow diagram depicting one or more embodiments described herein.

With reference back to the drawings, FIG. 3 illustrates an alternative flow diagram 200 according to one or more embodiments. However, it should be noted that the flow diagram 200 illustrated in FIG. 3 is merely exemplary, and the operation, function or steps of the method may be performed in a fashion other than the order described herein. Operation 202 illustrates that the frontal, longitudinal, and lateral sensors 22, 24, 26, 28 may generate and transmit acceleration signals to the controller 14. The controller 14 may receive the accelerations signals from the frontal, longitudinal, and lateral sensors 22, 24, 26, 28, and the flow diagram 200 proceeds to operation 204.

In operation 204, the controller 14 may determine whether the acceleration signals received from the frontal sensors and longitudinal sensors 22, 24, 26 exceed a front crash threshold. By comparing the acceleration signals from the frontal and longitudinal sensors 22, 24, 26 to the front crash threshold, the controller 14 may determine whether the vehicle 10 has been involved in a frontal crash. If the controller 14 determines that the vehicle 10 has been involved in frontal crash, then the flow diagram 200 proceeds to operations 206 and 210. However, if the controller 14 determines that the vehicle 10 has not been involved in a frontal crash, then the flow diagram 200 proceeds back to operation 202.

In operation 206, the controller 14 may employ Equation (1) illustrated above in order to determine the front rotational severity level using the acceleration sensors 22, 24. With reference to Equation (1), the controller 14 may first integrate the acceleration signals received from the frontal sensors 22, 24 in order to determine a pair of velocity values. Once the pair of velocity values has been determined, the controller 14 may determine the front rotational severity level by taking the difference between the pair of velocity values.

The controller 14 may then compare the front rotational severity level against a rotational severity level threshold. If the front rotational severity level does not exceed the rotational severity level threshold, then the controller 14 may determine that the vehicle 10 is not experiencing sufficient rotational energy about an axis normal to the surface of the road, and the flow diagram 200 proceeds to operation 208. In operation 208, the controller 14 may deploy the front safety systems 18. More particularly, the controller 14 may deploy the front airbags 32, 34 and/or engage the pair of seat belt pretensioning systems 36, 38.

With reference back to operation 206, if the front rotational severity level does exceed the rotational severity level threshold, then the controller 14 may determine that the vehicle 10 is experiencing sufficient rotational energy about an axis normal to the surface of the road and the flow diagram 200 proceeds to operation 212. In operation 212, the controller 14 may deploy both the front and side safety systems 18, 20. More particularly, the front safety systems 18 deployed in operation 212 may include the pair of front airbags 32, 34, and/or the seat belt pretensioning systems 36, 38. The side safety systems 20 deployed in operation 212 may include the curtain airbags 40 and 42. By deploying the front and side safety systems 18, 20, the occupant may be protected if the vehicle 10 is experiencing rotational energy about an axis normal to the surface of the road.

With reference back to operation 204, if the controller 14 determines that the vehicle 10 has been involved in frontal crash, then the flow diagram 200 also proceeds to operation 210. In operation 210, the controller 14 may employ Equation (2), illustrated above, in order to determine the rotational severity ratio using the acceleration signals transmitted by the longitudinal and lateral sensors 26, 28. With reference to Equation (2), the controller 14 may first integrate the acceleration signals received from the longitudinal and lateral sensors 26, 28 in order to determine a longitudinal and lateral velocity of the vehicle 10. After determining the longitudinal and lateral velocity of the vehicle 10, the controller 14 may determine the rotational severity ratio by dividing the lateral velocity by the longitudinal velocity, as illustrated in Equation (2).

The controller 14 may also compare the rotational severity ratio against a rotational severity ratio threshold. If the controller 14 determines that the rotational severity ratio exceeds the rotational severity ratio threshold, then the controller 14 may determine the vehicle 10 is experiencing sufficient rotational energy about an axis normal to the surface of the road, and the flow diagram 200 proceeds to operation 212.

With reference to operation 212, the controller 14 may deploy both the front and side safety systems 18, 20. More particularly, the front safety systems 18 deployed by the controller 14 may include the pair of front airbags 32, 34, and/or the seat belt pretensioning systems 36, 38. Also, the side safety systems 20 deployed by the controller 14 may include the curtain airbags 40 and 42. By deploying the front and side safety systems 18, 20, the occupant may be protected if the vehicle 10 is involved in a frontal crash that experiences sufficient rotational energy about an axis normal to the surface of the road.

With reference back to operation 210, if the rotational severity ratio is less than the rotational severity ratio threshold, then the controller 14 may determine that the vehicle 10 is not experiencing sufficient rotational energy about an axis normal to the surface of the road, and the flow diagram 200 proceeds to operation 208. In operation 208, the controller 14 may deploy the front safety systems 18. More particularly, the controller 14 may deploy the front airbags 32, 34 and/or engage the pair of seat belt pretensioning systems 36, 38.

While embodiments of this application may have been illustrated and described, it is not intended that those embodiments illustrate and describe the only embodiments of the application. Rather, the words used in the above application are words of description, rather than limitations and it should be understood that various changes may be made to the above description without departing with the spirit and scope of the application. Thus, specific details disclosed are merely representative basis for teaching one skilled in the art to practice the present application.

What is claimed:

1. A method for deploying a vehicle safety system in a vehicle, the method comprising:
   receiving at least two front acceleration signals indicative of acceleration along a longitudinal axis about a front end of the vehicle;
   receiving a longitudinal acceleration signal indicative of acceleration along a longitudinal axis about a center of gravity of the vehicle;
   upon a determination that the front acceleration signals and the longitudinal acceleration signal exceed a front crash threshold, determining a rotational value indicative of rotational velocity about an axis of the vehicle that is normal to a surface of a road; and
   deploying a vehicle safety system including deploying at least a front safety system based in part upon the rotational value.

2. The method of claim 1 further comprising:
   determining that the vehicle is experiencing rotational energy when the rotational value exceeds a rotational value threshold.

3. The method of claim 1, wherein the step of determining a rotational value further comprises:
   determining a first velocity using one of the at least two front acceleration signals;
   determining a second velocity using another of the at least two front acceleration signals; and
   determining the rotational value using the difference between the first and second velocities.

4. The method of claim 3 wherein the step of deploying a vehicle safety system including at least a front safety system comprises:

determining whether the rotational value exceeds a rotational value threshold; and upon a determination that the rotational value does not exceed the rotational value threshold, deploying only the front safety system.

5. The method of claim 3 wherein the step of deploying a vehicle safety system including at least a front safety system comprises:

determining whether the rotational value exceeds the rotational value threshold; and upon determination that the rotational value exceeds the rotational value threshold, deploying at least the front safety system and a side safety system.

6. The method of claim 1, wherein the step of determining a rotational value further comprises:

receiving a lateral signal indicative of acceleration along a lateral axis about a center of gravity of the vehicle;

determining a lateral velocity based upon an integral of the lateral signal;

determining a longitudinal velocity based upon an integral of the longitudinal acceleration signal; and determining the rotational value based upon the ratio of the lateral velocity to the longitudinal velocity.

7. The method of claim 6 wherein the step of deploying a vehicle safety system including at least a front safety system comprises:

determining whether the rotational value exceeds a rotational value threshold; and upon a determination that the rotational value does not exceed the rotational value threshold, deploying only the front safety system.

8. The method of claim 6 wherein the step of deploying a vehicle safety system including at least the front safety system comprises:

determining whether the rotational value exceeds a rotational value threshold; and upon a determination that the rotational value exceeds the rotational value threshold, deploying at least the first safety system and a side safety system.

9. The method of claim 1, wherein the step of determining a rotational value further comprises:

receiving a sensor signal using at least one rotational sensor, the rotational sensor signal being indicative of the rotational tendency, direction and angular velocity of the vehicle about an axis normal to a surface of a road; and determining the rotational value using the at least one sensor signal.

10. The method of claim 9 wherein the step of deploying a vehicle safety system including at least a front safety system comprises:

determining whether the rotational value exceeds a rotational value threshold; and upon a determination that the rotational value does not exceed the rotational value threshold, deploying only the front safety system.

11. The method of claim 9 wherein the step of deploying a vehicle safety system including at least a front safety system comprises:

determining whether the rotational value exceeds a rotational value threshold; and upon a determination that the rotational value exceeds the rotational value threshold, deploying at least the front safety system and a side safety system.

12. A method for deploying a vehicle safety system in a vehicle, the method comprising:

receiving at least two front acceleration signals indicative of acceleration along a longitudinal axis about a front end of the vehicle;

receiving a longitudinal acceleration signal indicative of acceleration along a longitudinal axis about a center of gravity of the vehicle;

determining a frontal rotational severity level using the at least two front acceleration signals when at least the front acceleration signals and the longitudinal acceleration signal exceed a front crash threshold; and deploying a vehicle safety system including at least a front safety system and a side safety system when the frontal rotational severity level exceeds a rotational severity level threshold.

13. The method of claim 12 further comprising:

determining that the vehicle is experiencing rotational energy when the frontal rotational severity level exceeds the rotational severity level threshold.

14. The method of claim 12, wherein the step of determining the frontal rotational severity level further comprises:

determining a first velocity using one of the at least two front acceleration signals;

determining a second velocity using another of the at least two front acceleration signals; and determining the frontal rotational severity level using the difference between the first and second velocities.

15. The method of claim 12 further comprising:

receiving a lateral acceleration signal indicative of acceleration along a lateral axis about a center of gravity of the vehicle;

determining a lateral velocity based upon an integral of the lateral acceleration signal;

determining a longitudinal velocity based upon an integral of the longitudinal acceleration signal;

determining a rotational severity ratio based upon the ratio of the lateral velocity and the longitudinal velocity; and deploying the front safety system and the side safety system of the vehicle safety system when the front and the longitudinal acceleration signals exceed the front crash threshold and the rotational severity ratio exceeds the rotational severity ratio threshold.

16. A system for deploying a vehicle safety system in a vehicle, the system comprising:

at least two front acceleration sensors configured to receive at least two front acceleration signals indicative of acceleration along a longitudinal axis about a front end of the vehicle;

at least one longitudinal acceleration sensor configured to receive at least one longitudinal acceleration signal indicative of acceleration along a longitudinal axis about a center of gravity of the vehicle; and a controller configured to:

determine a rotational value indicative of rotational velocity about an axis of the vehicle that is normal to a surface of a road when the front acceleration signals and the longitudinal acceleration signal exceed a front crash threshold; and deploy a front safety system and a side safety system when the rotational value exceeds a rotational value threshold.

17. The system of claim 16, wherein the controller is further configured to:

determine that the vehicle is experiencing rotational energy when the rotational value exceeds the rotational value threshold.

18. The system of claim 16, wherein the controller is further configured to:

determine a first velocity using one of the at least two front acceleration signals;
determine a second velocity using a second of the front acceleration signals; and
determine the rotational value using the difference between the first and second velocities.

19. The system of claim 16 further comprising
a lateral sensor configured to generate a lateral acceleration signal indicative of acceleration along a lateral axis about a center of gravity of the vehicle; and
the controller further being configured to:
 determine a lateral velocity based upon an integral of the lateral acceleration signal;
 determine a longitudinal velocity based upon an integral of the longitudinal acceleration signal; and
 determine the rotational value based upon the ratio of the lateral velocity to the longitudinal velocity.

20. The system of claim 16 further comprising
a rotational sensor configured to generate a rotational signal indicative of the rotational tendency, direction and angular velocity of the vehicle about an axis normal to a surface of a road; and
the controller further being configured to:
 receive the rotational signal; and
 determine the rotational value using the rotational signal.

* * * * *